Sept. 17, 1963  E. C. POLHAMUS  3,104,082
VARIABLE SWEEP AIRCRAFT WING
Filed Nov. 16, 1961  2 Sheets-Sheet 1

INVENTOR
EDWARD C. POLHAMUS

BY

ATTORNEYS

Sept. 17, 1963  E. C. POLHAMUS  3,104,082
VARIABLE SWEEP AIRCRAFT WING
Filed Nov. 16, 1961  2 Sheets-Sheet 2
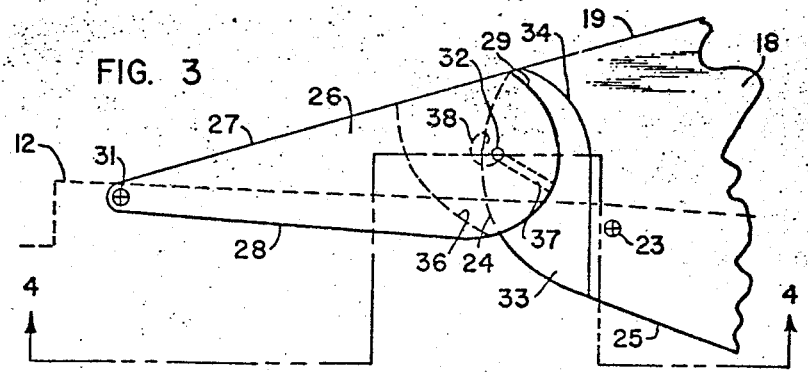
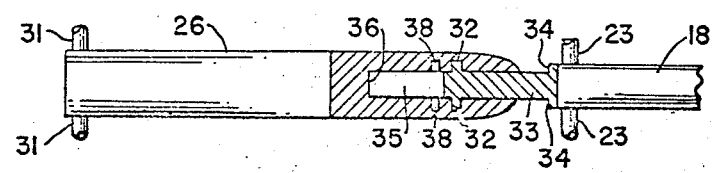
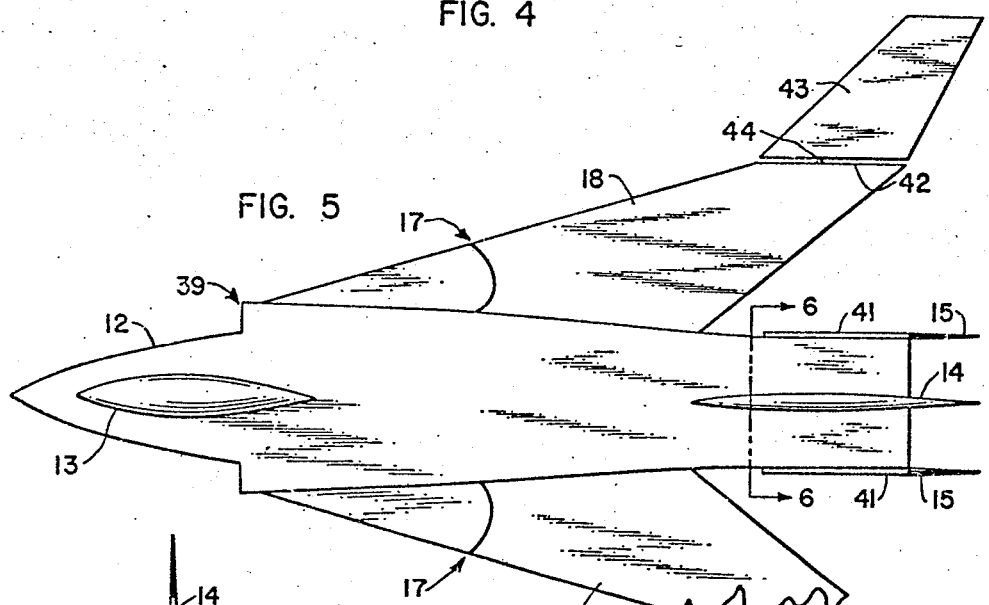
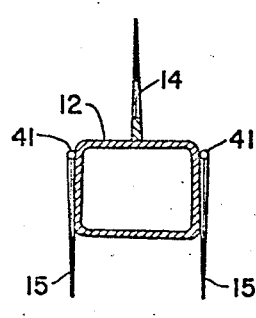
INVENTOR
EDWARD C. POLHAMUS
BY
ATTORNEYS _United States Patent Office_

3,104,082
Patented Sept. 17, 1963

3,104,082
VARIABLE SWEEP AIRCRAFT WING
Edward C. Polhamus, Newport News, Va., assignor to the United States of America as represented by the Administrator of the National Aeronautics and Space Administration
Filed Nov. 16, 1961, Ser. No. 153,266
6 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

This invention relates generally to aerial vehicles, and more particularly to supersonic airplanes having variable sweep wing sections.

The invention is considered to be particularly useful for application to aircraft having high supersonic speed capabilities on the order, say, of Mach 3.0. The airframe configuration requirements for efficient supersonic flight, however, are not compatible with the configuration requirements for efficient low speed flight, takeoff and climb, or descent and landing. The optimum wing planform for low speed flight, and conventional takeoff and landing, is considered to include a long span, narrow chord wing having a low sweep angle. The total lift developed by a lifting wing, other factors such as angle of attack and dynamic pressure being equal, is substantially proportional to aspect ratio, which may be defined as the square of the span of the wing divided by the surface area thereof. It will be immediately apparent, therefore, that a long narrow wing may develop many multiples of the total lift obtainable with a short broad wing of the same plan area, thereby reducing the angle of attack required for landing and takeoff. Moreover, drag due to lift is reduced as the aspect ratio is increased, thereby providing high aerodynamic efficiency for subsonic cruise. The high aspect ratio wing, of course, permits relatively short takeoff and landing roll, as well as low speed climb to altitude, thereby making feasible the use of small and relatively rough airports, which may be located even in fairly densely populated and built up areas. For transonic and supersonic flight, however, highly swept leading edge, low aspect ratio wings are considered preferable, since aerodynamic drag may be greatly reduced thereby, and other advantages enumerated hereinafter may also be obtained. During supersonic cruise at high altitudes, at which fuel consumption per mile traveled is minimized, at the high angles of attack required the highly swept leading edge wing configuration develops a comparatively low drag coefficient while developing the required lift coefficient. It has been experimentally shown that lift/drag ratios of from 6.0 to 8.0 may be obtained with the highly swept leading edge wing at supersonic high altitude cruise, making such flights economically feasible even in the case of commercial transport aircraft. The highly swept leading edge wing configuration is also preferred for supersonic flight at low levels, where the combination of high dynamic pressure and the high frequency end of the gust spectrum may establish the structural strength requirements of an aircraft, since the gust loads imposed on a highly swept leading edge wing are much smaller than on a more or less straight wing, due to a smaller change in lift force resulting from change in angle of attack. This result is due to the fact that a moving aircraft experiences atmospheric turbulence only as sudden changes in angle of attack, which may be said to be the direction of the resultant of the vertical component of gust velocity and the horizontal component of aircraft velocity. It is, of course, generally undesirable to operate supersonic aircraft at low levels; an exception being the case of military aircraft operating over hostile territory where low altitude flight is considered to reduce the vulnerability of the aircraft to attack and to increase the chances of avoiding radar detection; due to the fact that extensive shock wave damage may be experienced by buildings and like structures adjacent the flight path of an aircraft flying at supersonic speeds below an altitude of, say, 100 feet.

It will now be apparent, from the foregoing discussion, that an aircraft of the swept leading edge wing type designed solely on the basis of high supersonic, high performance flight will not perform satisfactorily for subsonic cruise, takeoff and landing. Even present day low supersonic aircraft are designed with aspect ratios higher and wing sweeps lower than that considered optimum for supersonic cruising flight in order to make takeoff and landing feasible, and the takeoff ground roll distance requirements of around 10,000 feet for these aircraft are nearing an upper limit. These low supersonic aircraft must also climb to cruise altitude at subsonic speeds to prevent heavy shock wave ground damage, at the expense of increased fuel consumption, since the relatively low aspect ratio of the wings thereof results in increased drag due to lift while in the climb. The severity of this problem may be exemplified by a typical fuel consumption record of a low supersonic swept wing transport on a transAtlantic flight, where normally 30 percent or more of the total fuel will be expended in takeoff and climb to cruise altitude at subsonic speeds.

The most promising line of attack taken in the past to overcome the configuration incompatibility problem outlined hereinbefore involves in flight variation of wing planform geometry, and particularly simultaneous variation of both wing sweep and aspect ratio. Intensive investigation of this concept began with the extensive flight testing early in the previous decade by the United States Government of one such variable sweep aircraft. This aircraft was provided with in flight variable sweep wings which were movable in their entirety about longitudinally translatable pivot points closely proximate to the wing planform plane of symmetry. The complete flight test program of this aircraft revealed unsatisfactory stability and control characteristics, however, and it was determined that such elaborate and massive control mechanism for varying wing sweep and translating the wing pivots would be required to convert the design into a useful operational aircraft that performance penalties due to added weight resulting from the use thereof would more than offset the advantages derivable from the use of variable wing sweep. The test program on this aircraft demonstrated the feasibility of in flight wing rotation, however, and also pointed out the desirability of eliminating the need for wing translation. Subsequently, other variable sweep wing planforms were investigated both in this country and abroad by persons concerned with producing a fully operational aircraft design capable of obtaining the advantages, while avoiding the penalties, associated with variable wing sweep. These programs, over a period of several years, produced generally negative results, leading to a general rejection of the variable wing sweep concept by the manufacturers and users of supersonic aircraft. In view of the potential of this concept, however, research efforts to overcome the deficiencies inherent in previously proposed variable sweep wing configurations continued, finally resulting in the invention by W. J. Alford, Jr., and E. C. Polhamus of one variable sweep wing planform which, as disclosed in their copending application for U.S. Letters Patent filed July 7, 1960, Serial No. 41,455, now Patent Number 3,053,484, is considered to provide, in an aircraft having a conventional fuselage carrying propulsion means therein, forwardly located wings, and a conventional aft empennage arrangement, a successful and fully operational design for varying aspect ratio and wing sweep which eliminates the necessity of providing means for longitudinally shifting wing panel pivot points. While the invention disclosed in Patent Number 3,053,484 is considered far superior to the variable sweep wing configurations proposed theretofore, certain of the aerodynamic characteristics of the variable sweep wing set forth therein are not considered completely desirable, although successful practice of the invention as disclosed is not seriously adversely affected thereby. The copending Alford et al. patent discloses a variable sweep wing configuration including a fixed inboard wing panel having a highly swept leading edge and an outboard wing panel extending outwardly from the fixed inboard wing panel and pivotally connected thereto for rotation in the wing areal plane to vary the leading edge sweep thereof between a small angle and a large angle. The extreme leading edge discontinuity of the wing disclosed in the copending Alford et al. patent, for the condition of the outboard wing panel in the low sweep attitude, sets up undesirable longitudinal stability problems at moderate and high angles of attack, which necessitates the provision of suitable compensation means which have been developed therefor. Further, the flow field associated with the aforementioned wing leading edge discontinuity tends to reduce the directional stability contributed by the vertical tail of the aircraft disclosed in the copending Alford et al. patent at the higher angles of attack. The improvement in variable sweep wing aircraft forming the subject matter of the present invention is considered to provide all the advantages of the wing configuration disclosed in the copending Alford et al. patent while eliminating the limitations thereof set forth hereinbefore.

Accordingly, it is an object of the present invention to provide a new and improved variable aspect ratio wing planform for an aircraft.

Another object of the instant invention is the provision of a new and improved variable leading edge sweep wing planform for a supersonic aircraft.

A still further object of the instant invention is the provision of a new and improved variable sweep wing planform for a supersonic aircraft operable to vary aspect ratio without adversely affecting the control and stability characteristics of the aircraft.

Another still further object of the present invention is the provision of a new and improved variable sweep wing planform for a supersonic aircraft for maximizing aspect ratio for subsonic takeoff, climb, cruise, descent, and landing.

Still another object of the instant invention is the provision of a new and improved variable sweep wing planform for a supersonic aircraft for minimizing aspect ratio during supersonic cruise.

According to the present invention, the foregoing and other objects are attained by providing, in a powered aircraft having a conventional fuselage including a conventional aft empennage assembly and fuselage carried propulsion engines, a wing projecting from each side of the fuselage. Each wing includes a main wing panel pivotally connected to the fuselage near the outboard edge thereof for rotation in the wing areal plane to vary the leading edge sweep thereof between a small angle on the order of about 25 degrees and a large angle on the order of about 75 degrees, and a forward wing panel pivotally connected adjacent its forward extremity to the fuselage near the outboard edge thereof and pivotally linked adjacent its after extremity to the main wing panel. The linkage between the forward wing panel and the main wing panel is such that when the main wing panel is positioned in its lowest sweep attitude, the forward wing panel is completely retracted into the fuselage, but as the main wing panel is swept rearwardly toward its highest sweep attitude, the forward wing panel rotatably extends about its forward fuselage pivotal connection from the side of the fuselage to form a forward extension of the main wing panel. The leading edge of the entire wing constituted by the main wing panel in its highest sweep attitude and the fully extended forward wing panel is substantially linear and free of discontinuities.

A more complete appreciation of the invention and many of the attendant advantages thereof will be readily apparent as the same becomes better understood by reference to the following detailed description when considered in connection with the accompanying drawing wherein:

FIG. 3 is a somewhat schematic plan view, on an enlarged scale, of the forward wing panel and a portion of the main wing panel of the present invention showing their disposition with respect to the aircraft fuselage and the interlinked disposition of each panel to the other;

FIG. 4 is a elevational view of the wing panels, partially in section, taken along the line 4—4 of FIG. 3;

FIG. 5 is a plan view of an alternative embodiment of the variable sweep wing aircraft of the present invention; and, FIG. 6 is an elevational view, partially in section, of the fuselage and empennage assembly of the aircraft of FIG. 5 taken along the line 6—6 of FIG. 5.

Figure 1:
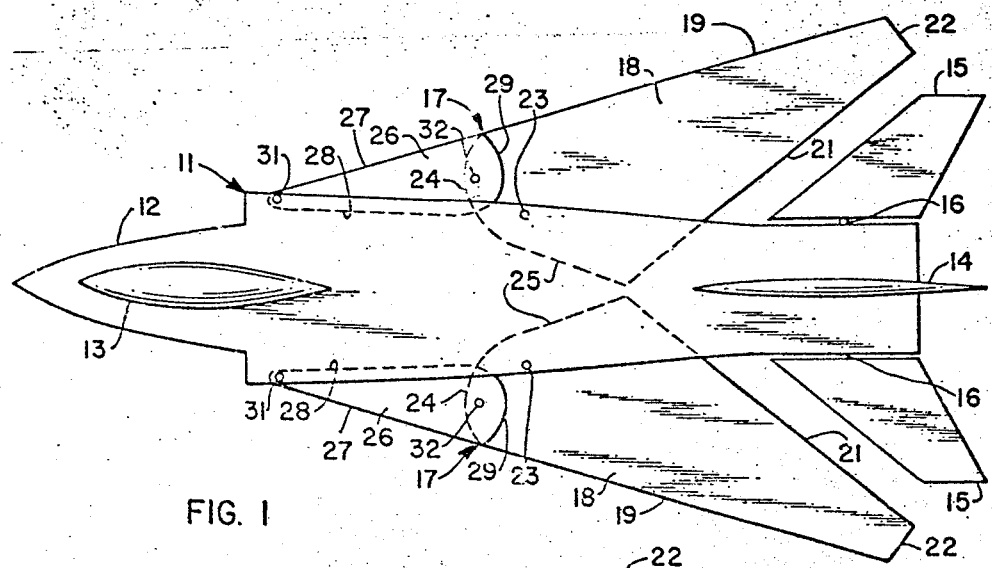
FIG. 1 is a plan view of a variable sweep wing aircraft with the wings thereof disposed in a low aspect ratio high sweep supersonic cruise position.
Figure 2:
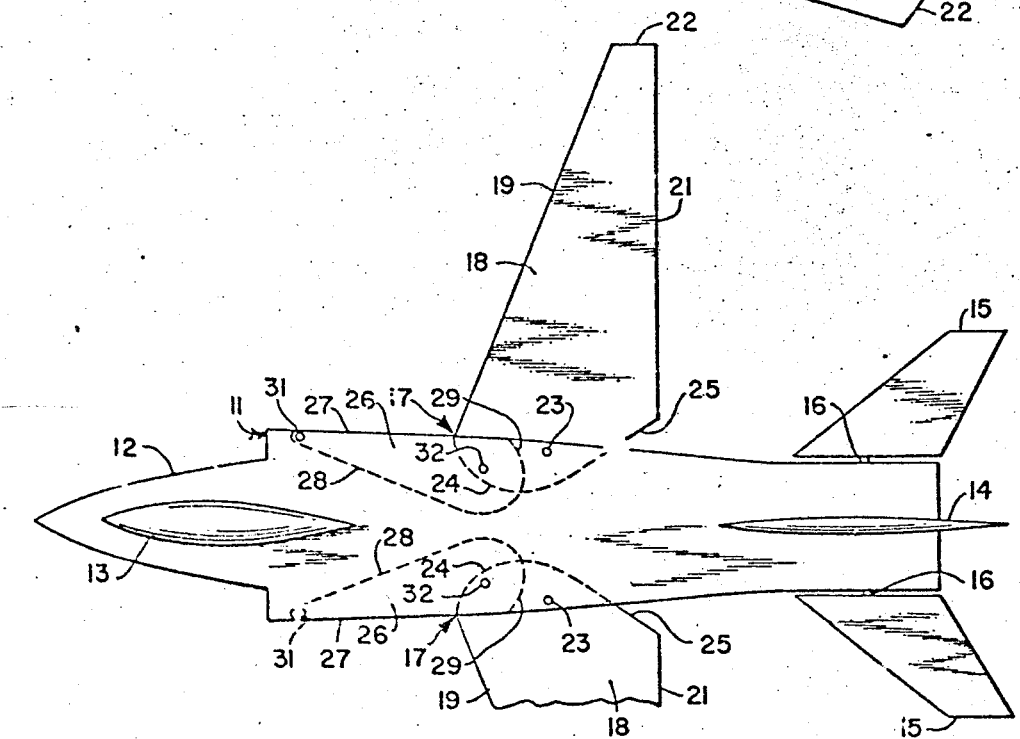
FIG. 2 is a plan view of the aircraft of FIG. 1 with the wings thereof disposed in a high aspect ratio low sweep subsonic takeoff, ascent, flight, descent, and landing position.

Referring now more particularly to the drawings, wherein like reference numerals designate identical parts throughout the several views, and more explicitly to FIGS. 1 and 2, there is shown a variable sweep wing planform aircraft, generally designated by the reference numeral 11. Aircraft 11 is provided with a conventional fuselage 12 of the type having a reaction propulsion motor mounted therein, and which is proportioned to have a length to equivalent diameter, or fineness ratio, suitable for supersonic flight. A suitable control compartment or pilot's cabin 13 is also include in fuselage 12 adjacent the forward end thereof. A conventional empennage assembly including a vertical stabilizer member 14 projecting upwardly from the upper surface of fuselage 12 and swept horizontal stabilizer members 15 projecting outwardly from the sides of fuselage 12 is also provided, and is positioned aft adjacent the after end of the fuselage. The airfoil sections of these stabilizer members 14 and 15 are preferably taken from the supersonic family of symmetrical thin airfoils. The stabilizer surfaces 15 are of the "all movable" type; that is, each surface 15 is mounted to rotate about an axis extending transversely outwardly from the sides of fuselage 12, entering the surface 15 substantially normal to the root section at about the 50 percent station thereof, and running substantially coplanar with the mean planform plane of the surface. More particularly, a suitable connection between each of the stabilizer surfaces 15 and fuselage 12 may comprise an elongated cylindrical element 16 having its longitudinal axis collinear with the axis of rotation of the surface 15 and having one end thereof rigidly connected to the stabilizer surface root section. Substantially the entire lengths of the elements 16 are rotatably mounted within the fuselage 12; the gap between fuselage 12 and stabilizer surfaces 15 having been exaggerated in FIGS. 1 and 2 to more clearly point out the all movable nature of these stabilizer members, and to show a small portion of the lengths of elements 16. The ends of elements 16 within fuselage 12 are interconnected with a suitable conventional mechanism, not shown, operable to rotate the stabilizer members 15 about the longitudinal axes of elements 16 in either direction in unison to provide aircraft pitching control and also operable to rotate the members 15 about the longitudinal axes of elements 16 in either direction in opposition to provide rolling control of the aircraft. Preferably, the elements 16 are also made pivotal about their inner ends in a plane perpendicular to the fuselage longitudinal axis, since it has been found that under appropriate circumstances negative horizontal stabilizer deflection may provide significant variations in the longitudinal and directional stability characteristics of aircraft 11. It is not an object of the present invention, however, to provide suitable specific mechanism for rotating and deflecting the horizontal stabilizer members, and accordingly no such specific mechanism is herein disclosed.

Aircraft 11 is also provided with a wing projecting outwardly from each side of fuselage 12 and generally designated by the reference numeral 17. Each wing 17 includes a main wing panel 18 having a straight leading edge 19 and a straight trailing edge 21 which converge outwardly toward a tip section 22. Referring now to FIG. 2, it will be seen that when wing panel 18 is positioned in the most forwardly swept attitude, the sweep angle of the leading edge 19 thereof will be on the order of about 25 degrees; the trailing edge 21 will be disposed substantially perpendicularly with respect to the plane of symmetry of aircraft 11; and the tip section 22 will be substantially parallel to the aircraft plane of symmetry. The root end of wing panel 18 extends into fuselage 12 through a suitable slot formed in the side thereof, and occupies a suitable recess within fuselage 12. The main wing panel 18 is suitably connected to fuselage 12 for rotation in the wing areal or planform plane about a pivot point 23 located within fuselage 12 near the outboard edge thereof and which is located with respect to wing panel 18 on about the 45 percent chord line thereof adjacent its root end. Wing panel 18 includes a root section having an arcuate forward portion 24 which fairs into a straight after portion 25, as illustrated in FIGS. 1 and 2 of the drawings. It will be noted that, as illustrated, the straight portion 25 of the root section of wing panel 18 projects outwardly from fuselage 12 before meeting the panel trailing edge 21 when the wing panel 18 is positioned in the low sweep attitude, but the width of fuselage 12 dictates this expedient, since otherwise the root section of wing panel 18 would cross the axis of symmetry of fuselage 12 when the wing panel 18 is positioned in the high sweep attitude shown in FIG. 1 and interfere with the similar wing panel 18 disposed on the other side of fuselage 12.

Each wing 17 also includes a forward wing panel 26 which is substantially fan-shaped in planform; having a straight leading edge 27, a straight root section 28, and an arcuate trailing edge 29. The forward wing panel 26 is completely positionable within fuselage 12 in a suitable recess formed therein, which lies in the same plane as the fuselage recess accommodating the root end of main wing panel 18, and the wing panel 26 is extensible from the recess through a suitable slot formed in the side of fuselage 12. The forward wing panel 26 is suitably connected to fuselage 12 for rotation in the wing areal or planform plane about a pivot point 31 located within fuselage 12 near the outboard edge thereof and which is situated with respect to wing panel 26 adjacent the forward end thereof near the "apex" of the straight leading edge 27 and straight root section 28. The main wing panel 18 and the forward wing panel 26 are interlinked in such a way that a link point 32 situated near the forward arcuate portion 24 of the root section of wing panel 18, and fixed with respect thereto, will traverse a predetermined path with respect to the planform surface of wing panel 26 as wing panel 18 is swept rearwardly from the low sweep attitude shown in FIG. 2 to the high sweep attitude shown in FIG. 1, and force wing panel 26 to emerge from its fuselage retracted position as shown in FIG. 2 to its extended position as shown in FIG. 1, in which wing panel 26 forms a forward extension of wing panel 18, with the leading edges of wing panels 18 and 26 collinear and free of discontinuities, as will be more particularly set forth hereinafter.

Referring now more explicitly to FIGS. 3 and 4 of the drawings, which show on an enlarged scale the forward wing panel 26 and a portion of the main wing panel 18, the interlinked relationship of the wing panels will become apparent. In FIG. 3, the location of main wing panel 18 and forward wing panel 26, which are disposed in the high sweep wing attitude of FIG. 1, with respect to fuselage 12, shown in phantom outline, will be readily discernible, as will the overlapping relationship of the wing panels each to the other. The portion 33 of main wing panel 18 which may overlap wing panel 26 is of reduced thickness; the thickness of portion 33 being constant over its entire area with the exception of the portion thereof forming link point 32 and forming shoulders 34 of equal height along its line of integral connection with the main portion of wing panel 18. The link point 32 is constituted by a cylindrical stud formed integrally with portion 33 of wing panel 18 projecting from each surface thereof a distance equal to the height of a shoulder 34. The forward wing panel 26, which is somewhat greater in thickness than the main portion of main wing panel, is provided with a medial slot 35 formed in that portion thereof which may overlap the portion 33 of main wing panel 18; the interior edge of the slot being defined by a vertical wall 36. The total depth of slot 35 is somewhat greater than the thickness of portion 33 of main wing panel 18, which may be introduced into slot 35. In order to move the portion 33 of wing panel 18 into slot 35 of wing panel 26, an assembly groove 37 is cut into each of the opposed surfaces of wing panel 26 defining the faces of slot 35, along which the studs defining link point 32 may be passed. An operating groove 38, which is substantially U-shaped in planform, is also cut into each of the opposed faces of slot 35, one end of each U-shaped groove 38 communicating with the interior end of an assembly groove 37; the grooves 38 being sufficiently large to permit the studs constituting link point 32 to pass therealong. The ends of U-shaped grooves 38 which communicate with the interior ends of grooves 37 are so located with respect to the surface of wing panel 26 that the link point 32 studs will be disposed therein when the main wing panel 18 and forward wing panel 26 are disposed in the high wing sweep attitude as shown in FIG. 3 of the drawings, as well as in FIG. 2. The U-shaped planform of grooves 38 is such that, as main wing panel 18 sweeps forward to the low wing sweep position illustrated in FIG. 1, the movement of the link point 32 studs therealong will cause the forward wing panel 26 to concurrently retract into fuselage 12 until it is completely disposed therein. The shape and the position of the terminal points of the U-shaped grooves 38 illustrated in FIG. 3 were determined by the specific requirements of the spacing between pivot points 23 and 31; the position of link point 32 in the low sweep, transition, and high sweep attitudes of main wing panel 18; and by the retracted, transition, and fully extended positions of forward wing panel 26. These parameters, of course, may be altered as found desirable, necessitating the replotting of the shape and terminal points of grooves 38, which may be readily accomplished through the application of basic and well known principles of descriptive geometry.

The entire wing 17 is so mounted on fuselage 12 with respect to the center of gravity of aircraft 11, not shown, that the quarter chord point of the mean aerodynamic chord of the main wing panel 18 when positioned in its most forwardly swept attitude will be positioned approximately at the same aircraft longitudinal station as the aircraft center of gravity.

The actual construction of the wing panel pivotal connections, as well as the mechanism to effect pivotal movement of the main wing panels 18, is not considered to form part of the present invention, and has been omitted in the interest of clarity. The showing of control surfaces and the like on the main wing panels 18 has likewise been omitted; however, such surfaces may be required in the actual practice of the invention.

A salient feature of the present invention is considered to be the simplicity of the foregoing structural arrangement of the variable sweep wings, with which adequate longitudinal and directional stability is obtained in both the high and low sweep positions, and which is also conducive of the use of the aft empennage arrangement to secure adequate control characteristics. The main wing panel 18 may, in the low sweep, high aspect ratio attitude shown in FIG. 2, correspond almost exactly to the shape of a fixed wing having low sweep and a high aspect ratio provided on an aircraft designed solely for low speed operations. When, however, the main wing panel is positioned in its high sweep, low aspect ratio attitude shown in FIG. 1, the entire wing 17 defined by both main wing panel 18 and forward wing panel 26 corresponds almost exactly to the shape of a fixed wing having high sweep and a low aspect ratio provided on an aircraft designed solely for supersonic operations. It will further be noted that the center of lift of the wing of the present invention remains positioned compatibly with respect to the aircraft center of gravity at both extremes of sweep of main wing panel 18.

In operation, aircraft 11 would begin its takeoff run with the wing 17 positioned in the high aspect ratio attitude shown in FIG. 2 of the drawings, and wing 17 would remain in this attitude throughout the takeoff run and the portion of the climb accomplished at subsonic speeds. The main panel 18 of wing 17 would then be rotated to the position shown in FIG. 1 of the drawings for acceleration through the transonic speed range to the cruise Mach number. Upon completion of the supersonic cruise portion of the journey and deceleration of the aircraft 11 to subsonic speeds, wing panel 18 would then be swept forward to its high aspect ratio position and maintained therein during descent, loiter, and landing. Additionally, in the event of any in flight emergency requiring operation of aircraft 11 at subsonic speeds, the wing 17 may then be positioned in its high aspect ratio attitude to obtain maximum subsonic flight efficiency.

An alternative embodiment of the aircraft of the present invention, generally designated by the reference numeral 39, is shown in FIG. 5 of the drawings. Aircraft 39 is provided with the fuselage 12 of aircraft 11, which carries, also, a control compartment 13 and a vertical stabilizer member 14. Fuselage 12 of aircraft 39 also carries horizontal stabilizer members 15 adjacent the after end thereof which correspond to the horizontal stabilizer members 15 of aircraft 11. However, the horizontal stabilizer members 15 of aircraft 39, rather than being connected to fuselage 12 by the means 16 provided in aircraft 11, are attached thereto along hinge lines 41 which permit the horizontal stabilizer members 15 to be positioned in a vertically downwardly projected direction, as shown in FIGS. 5 and 6, as well as in a horizontally outwardly projecting direction, not shown, similar to the positioning of horizontal stabilizer members 15 of aircraft 11. Conventional means, not shown, are carried on the fuselage 12 of aircraft 39 for positioning and maintaining stabilizer members 15 in either of the aforementioned positions. Aircraft 39 also carries a wing 17 similar to that of aircraft 11, and which also includes a somewhat similar main wing panel 18. The main wing panel 18 of aircraft 39, however, is provided with a tip section 42 which is disposed substantially parallel to the axis of symmetry of aircraft 39 when the wing panel 18 thereof is disposed in the high sweep, low aspect ratio attitude, as illustrated in FIG. 5. Projecting outwardly from the tip section 42 of the main wing panel 18 of aircraft 39 is a highly swept auxiliary horizontal stabilizer member 43, which is connected thereto by means 44 which are similar to the means 16 used to connect horizontal stabilizer members 15 to fuselage 12 of aircraft 11.

Aircraft 39, similarly to aircraft 11, would take off and climb to cruise altitude with the panels 18 in the most swept forward attitude and the auxiliary stabilizer members 43 merely serving as extensions thereof. During this portion of the flight, the horizontal stabilizer members 15 of aircraft 39 would be horizontally extended to provide pitching control of aircraft 39. Upon reaching cruise altitude, however, when main wing panel 18 is rotated rearwardly to the high sweep attitude shown in FIG. 5, the auxiliary stabilizer members 43 would be actuated to provide for pitching control of aircraft 39, and the stabilizer members 15 thereof would be lowered to the inoperative position illustrated in FIGS. 5 and 6. When descent of aircraft 39 for landing is begun, the reciprocal of the aforementioned procedure is initiated. Some of the advantages obtained by the foregoing arrangement and operation of the parts of aircraft 39 during supersonic cruise may include, but are not limited to, removal of the fuselage mounted horizontal stabilizers from downwash developed by the wing of aircraft 39, increase in directional stability provided by the vertically disposed stabilizer members 15, and utilization of the auxiliary stabilizer members 43, which operate in an upwash field, for longitudinal trim of aircraft 39, thereby minimizing trim drag.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An aircraft having supersonic flight capabilities comprising a fuselage having a fineness ratio suitable for supersonic flight, propulsion means carried by said fuselage, an empennage assembly carried by said fuselage adjacent the after end thereof, and a wing connected to each side of said fuselage and projecting substantially horizontally and outwardly therefrom, each of said wings including: a main wing panel having a straight leading edge pivotally connected to said fuselage near the outboard edge thereof for rotation in a substantially horizontal plane between a low sweep position in which the inboard end of said leading edge is contiguous to the side of said fuselage and a high sweep position in which the inboard end of said leading edge is spaced from the side of said fuselage, a forward wing panel having a leading edge pivotally connected about a single pivot point adjacent a forward extremity thereof to said fuselage near the outboard edge thereof for rotational movement only about said single pivot point and in said substantially horizontal plane between a high sweep position in which said forward wing panel leading edge is collinear with said main wing panel leading edge when said main wing panel is disposed in said main wing panel high sweep position and a retracted position in which said forward wing panel is positioned within said fuslage and in which said forward wing panel leading edge is contiguous to the side of said fuselage, said forward wing panel having a rearward portion overlapping a portion of said main wing panel, and means linking said overlapping portions of said forward and main wing panels for effecting retraction of said forward wing panel into said fuselage when said main wing panel is rotated from said main wing panel high sweep position to said main wing panel low sweep position.

2. The aircraft as defined in claim 1, wherein said means linking said overlapping portions of said forward and said main wing panels comprises a projecting element fixed to one of said overlapping portions and a groove of predetermined configuration in the other of said overlapping portions traversable by said projecting element during wing rotation.

3. The aircraft as defined in claim 1, wherein said empennage assembly includes a stabilizer member projecting substantially horizontally outwardly from each side of said fuselage and connected thereto for rotation in either direction about an axis extending substantially transversely from said fuselage and coplanar with the medial areal plane of the stabilizer member for providing suitable aircraft control movements.

4. The aircraft as defined in claim 1, wherein said main wing panel includes a stabilizer member projecting substantially horizontally and outwardly from a tip section of said main wing panel and connected thereto for rotation in either direction about an axis extending substantially perpendicularly from said tip section and coplanar with the medial areal plane of the stabilizer member for providing suitable aircraft control movements.

5. The aircraft as defined in claim 1, wherein said empennage assembly includes a stabilizer member hingedly connected along a root section thereof to at least one side of said fuselage for rotation between a position in which said empennage assembly stabilizer member extends substantially horizontally outwardly from said side of said fuselage and a position in which said empennage assembly stabilizer member extends substantially vertically downwardly.

6. A variable sweep aircraft comprising, in combination: a fuselage having a fineness ratio suitable for supersonic flight, propulsion means carried by said fuselage, an empennage assembly carried by said fuselage adjacent the after end thereof, and a wing connected to each side of said fuselage and projecting substantially horizontally and outwardly therefrom, each said wing including a main wing panel and a forward wing panel, each said main wing panel having a straight leading edge pivotally connected to said fuselage for rotation in a substantially horizontal plane between a low-sweep position and a high-sweep position, each said forward wing panel having a straight leading edge portion pivotally connected at a single pivot point adjacent a forward extremity thereof to said fuselage near the outboard edge thereof for rotational movement only about said single pivot point and in said substantially horizontal plane between a high-sweep position in which said forward wing panel leading edge is collinear with said main wing panel leading edge when said main wing panel is disposed in said main wing panel high-sweep position and a retracted position in which said forward wing panel leading edge is contiguous to the side of said fuselage and said forward wing panel is positioned within said fuselage, said forward wing panel having a rearward medial slotted portion, said slotted portion being provided with a substantially U-shaped operating groove on the interior opposing faces thereof and a horizontally disposed assembly groove communicating with and of equal depth to said operating groove and leading to the aft end of said slotted portion, means linking said forward wing panel and said main wing panel including a projecting element extending from said main wing panel, said projecting element having a configuration permitting positioning thereof within said slotted portion and including a link stud near the outer extremity thereof adapted for movement through said assembly groove for connecting said main wing panel and said forward wing panel and adapted for movement along said operating groove during wing sweep.

References Cited in the file of this patent

UNITED STATES PATENTS

| 1,524,352 | Gephart | Jan. 27, 1925 |
| 2,670,910 | Hill et al. | Mar. 2, 1954 |
| 2,822,995 | Bowen | Feb. 11, 1958 |

FOREIGN PATENTS

| 695,026 | Great Britain | Aug. 5, 1953 |